United States Patent [19]

Brinkman

[11] Patent Number: 4,809,649
[45] Date of Patent: Mar. 7, 1989

[54] FOUR-STROKE INTERNAL-COMBUSTION ENGINE AND PROCEDURE FOR OPERATING SUCH AN ENGINE

[75] Inventor: Willem Brinkman, Velp, Netherlands

[73] Assignee: Thomassen International B.V., Rheden, Netherlands

[21] Appl. No.: 124,174

[22] Filed: Nov. 23, 1987

[51] Int. Cl.⁴ ............................................. F02B 25/00
[52] U.S. Cl. ........................................ 123/76; 123/432
[58] Field of Search .................................. 123/76, 432

[56] References Cited

U.S. PATENT DOCUMENTS

| | | | |
|---|---|---|---|
| 2,698,611 | 1/1955 | Knudsen | 123/76 |
| 2,940,432 | 6/1960 | Hijszeler | 123/76 |
| 4,194,473 | 3/1980 | Hidaki | 123/76 |
| 4,217,866 | 8/1980 | Nakajima | 123/76 |

FOREIGN PATENT DOCUMENTS

| | | |
|---|---|---|
| 104692 | 5/1963 | Netherlands . |
| 526310 | 9/1940 | United Kingdom ................ 123/76 |

Primary Examiner—E. Rollins Cross
Attorney, Agent, or Firm—Laurence R. Brown; Alfred J. Mangels

[57] ABSTRACT

A four-stroke cycle internal combustion engine including a scavenging air system to minimize the emission of oxides of nitrogen. The engine includes a scavenging valve to admit scavenging air into the cylinder, and the scavenging valve is so oriented as to cause scavenging air to flow radially toward the center of the cylinder. The inlet valve and valve seat are configured in such a way as to cause the air-fuel mixture to circulate circumferentially within the cylinder and a spark plug is provided to ignite the air-fuel mixture. Additionally, an air charging system is provided to pressurize the air that is introduced for scavenging purposes, and a portion of the air from the air charging system is conveyed to an air cooling system, within which the fuel is added to the air, whereupon the air-fuel mixture is cooled to a temperaturea below the temperature of the scavenging air.

10 Claims, 3 Drawing Sheets

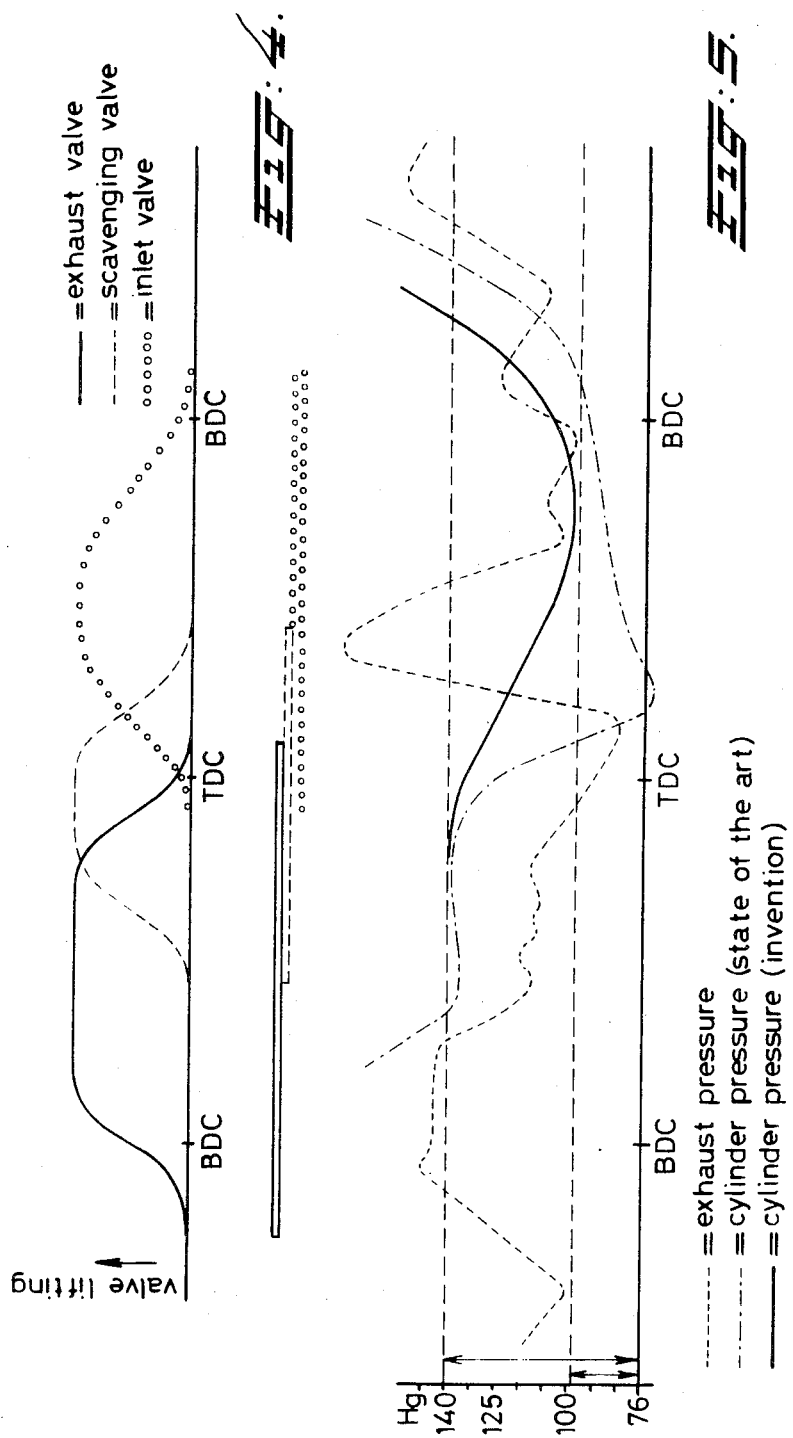

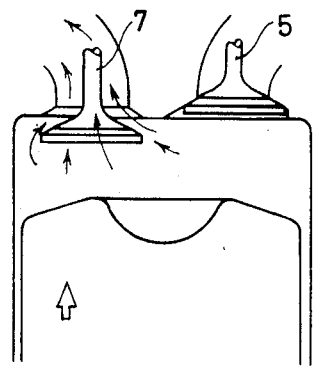
FIG: 6A.
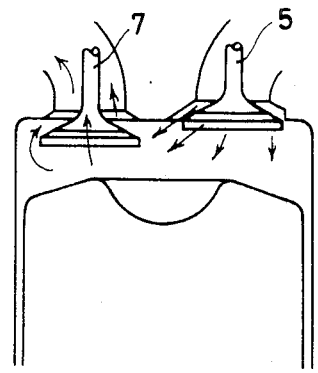
FIG: 6B.
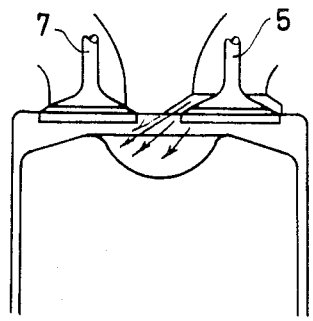
FIG: 6C.
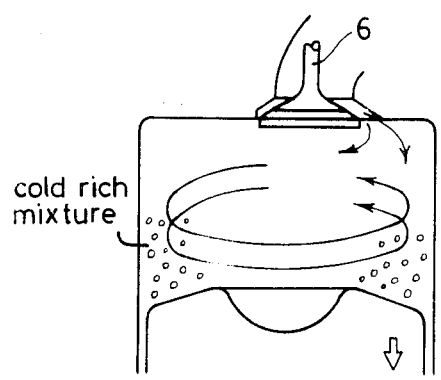
FIG: 7.
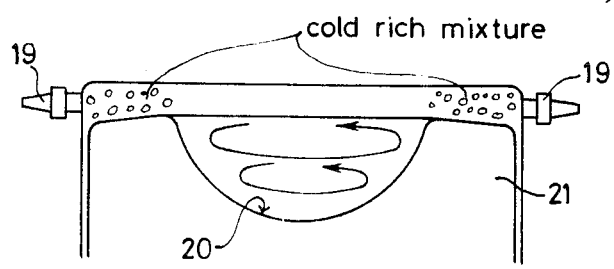
FIG: 8.

FOUR-STROKE INTERNAL-COMBUSTION ENGINE AND PROCEDURE FOR OPERATING SUCH AN ENGINE

BACKGROUND OF THE INVENTION

1. Field of the Invention

The invention relates to a mixture-compressing, four-stroke internal-combustion engine with air-scavenging. More particularly, the invention relates to such an engine fitted with a first conduit by which, with scavenging valve and exhaust valve open, scavenging air is supplied to a cylinder at a pressure above atmospheric by means of an air charging system, and thereafter, with the exhaust valve closed, a mixture of air and fuel at a pressure above or under atmospheric is supplied to the cylinder through a second conduit containing a throttle valve, the engine output being determined by regulating the quantity of the air-fuel mixture supplied to the engine.

2. Description of the Related Art

An engine of the general type identified above is described in, for example, Netherlands Pat. No. 104,692. Since then the efforts of manufacturers and users of gas engines have been directed toward reducing NOx emissions, in response to the growing requirements that are being made to maintain the environment, and in particular the purity of the atmosphere. The measures that have been taken in this connection include making the air-fuel mixture leaner, while at the same time adapting the ignition devices and giving optimum shape to the combustion chamber and the inlet and outlet passageways to and from the combustion chamber. However, it has been established that those measures present problems that affect the life of the ignition devices, as a result of which a lean-mixture, high-compression engine of this design has not found wide acceptance on the market. A well known possibility of reducing the NOx content is reducing the temperature of the cylinder charge by cooling of the inlet air. The cooling system used in the engine in accordance with the invention permits the reduction of the NOx content in the exhaust gases with a less lean air-fuel mixture, i.e., at a smaller λ value. In this way the problems with the ignition systems can greatly be avoided, opening the market for a new type of engine.

SUMMARY OF THE INVENTION

The present invention is directed to providing a different solution for the reduction of NOx emissions while avoiding the disadvantages noted earlier of lean-mixture, high-compression engines. That object is achieved in an internal-combustion engine in accordance with the present invention by the combination of a cylinder head with separately operated valves: a scavenging valve, an inlet valve, and an exhaust valve, with an air cooling system in the form of an expander unit in the passageway for the inlet air, with the air provided to the cooling system being at a pressure above atmospheric. Part of the available pressure difference between the air-fuel mixture inlet passageway and the scavenging air passageway is used to provide the required pressure drop across the expander unit.

The air cooling system used as an expander unit cases a pressure drop as a result of the efficiencies of a compressor and a turbine that are part of the expander unit. The pressure drop across the throttle valve that occurs in the engine design in accordance with the current state of the art can now be largely used to supply the above-mentioned pressure drop. The still needed increase in the air pressure of the air charging system for operating the expander unit successfully is thus slight. The result of using the expander unit as part of a cooling system is a considerable drop in the mixture temperature in the cylinder inlet passageway. The decrease in the NOx content of the exhaust gases to values that satisfy the legal requirements can thus be achieved with a less lean mixture than when no inlet air cooling is applied.

In the engine design in accordance with the current state of the art, the timing of the operation of the scavenging valve is determined by the point in the cycle during which scavenging and cooling of the combustion chamber is desired. The present invention makes it possible to operate the engine in such a way that regulation of the inlet valve and of the scavenging valve leads to such a time-flow diagram that each of these valves supplies half of the air requirement of the cylinder in question.

As a result of this procedure the scavenging valve timing has been changed to such an extent that the air supplied through the scavenging valve is optimally used to perform two functions, viz:

a. purging the combustion chamber of residual exhaust gases, so that the successive combustion cycles are as indentical as possible; and b. making the air-fuel mixtue supplied through the inlet valve leaner. The well-known cooling function of the scavenging air during the exhaust stroke is now supplemented during the intake stroke by the now cool air-fuel mixture.

As a result of the preceding measures, the mechanical and thermal loads on the engine will become more favorable than if the NOx reduction desired were to be achieved only by a leaner mixture. The difference in specific weight of the charge components, i.e., scavenging air and air-fuel mixture, make stratification possible through rotation of the charge. For this purpose the cooled, gaseous, air-fuel mixture is admitted into the combustion chamber as much as possible in a tangential direction. The following compression stroke, in conjunction with the selected piston shape, will further increase stratification. This makes it possible to provide an engine in which mixtures can be ignited in a reliable manner with approximately 50% excess air without the necessity of a precombustion chamber, with its thermal problems.

The invention is also directed to improving the mixing of the gaseous air-fuel mixture to be supplied through the inlet valve, thus making the factor in successive power strokes of the engine cylinders as uniform as possible. This desired result is achieved in accordance with the invention because the fuel supply and thus the mixing of the air-fuel mixture that flows into the cylinder through the inlet take place between the compressor and the intercooler of the air cooling system. The air and the fuel will now be subjected to good premixing in the expansion part of the air cooling-system.

The invention will be further explained by means of the drawings, a diagram and an example.

BRIEF DESCRIPTION OF THE DRAWINGS

FIG. 4 shows the valve timing diagram for the inlet, exhaust, and scavenging valves.

FIG. 4a is a valve timing diagram based on FIG. 4 and showing the extent of overlap of the valve open times for the respective valves.

FIG. 5 is a pressure diagram showing the pressure levels in the first and second conduits and the course of the pressure inside the cylinder and of the exhaust, in connection with the regulation of the valves in the cylinder head at an average effective pressure of 11.33 kg/sq. cm.

FIGS. 6A, B and C show three phases of the gas flow to and from the cylinder at TDC.

FIG. 7 shows the flow pattern within the cylinder during the intake stroke.

FIG. 8 shows the conditions within the cylinder at the end of the compression stroke.

DESCRIPTION OF THE PREFERRED EMBODIMENTS

Figure 1:
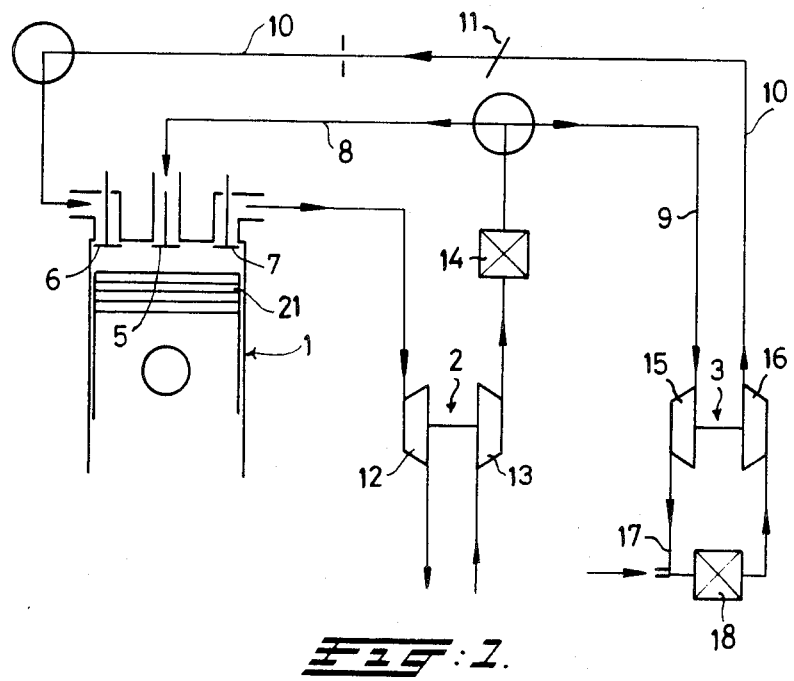
FIG. 1 is a schematic representation of portions of the inlet and exhaust systems of an engine in accordance with the present invention.

Referring now to the drawings, FIG. 1 shows a single cylinder 1 of an engine with an accompanying air charging system 2 and a cooling system 3, each of which systems will hereinafter be described in more detail. Cylinder 1 is fitted with a head 4 containing a scavenging valve 5, an inlet valve 6, and an exhaust valve 7. Each cylinder of the engine is fitted with a scavenging passageway 8 by which, with scavenging valve 5 and exhaust valve 7 opened, scavenging air is supplied to the cylinder at a pressure above atmospheric by means of air charging system 2. Thereafter, with exhaust valve 7 closed, a mixture of air and fuel is supplied by an inlet passageway 10 to the cylinder. The volume of the air-fuel mixture that enters the cylinder is controlled by throttle valve 11 positioned in inlet passageway 10.

Air charging system 2 includes an exhaust gas driven turbine 12 and a low pressure compressor 13, each of which is mounted on the same shaft. The compressed air from compressor 13 passes through a cooler 14 to scavenging passageway 8.

Air cooling system 3 includes a low-pressure compressor 15 and a turbine 16, each of which is mounted on the same shaft. In connecting conduit 17, which extends from the outlet of compressor 15 to the inlet of turbine 16, an intercooler 18 is positioned.

Figures 2, 3:
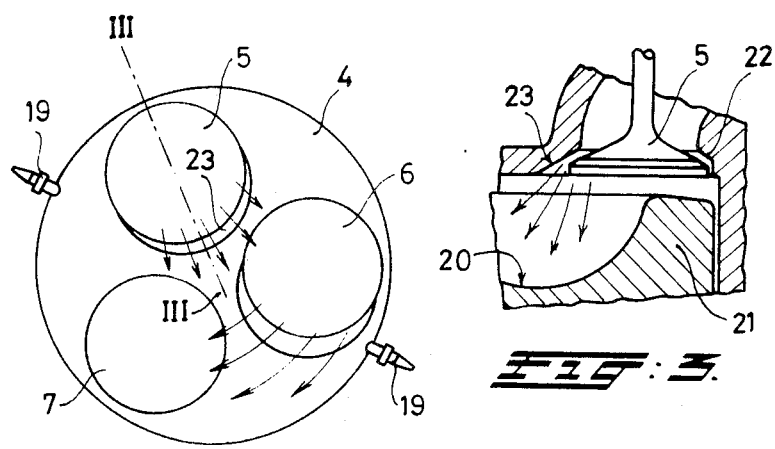
FIG. 2 is a top view of the engine cylinder head of FIG. 1 and illustrates the directions of flow of the scavenging air and of the air-fuel mixture therein.
FIG. 3 is an enlarged fragmentary view, partially in section, of the scavenging valve in the cylinder head along the line III—III of FIG. 2.

FIG. 2 shows the positions in cylinder head 4 of scavenging valve 5, inlet valve 6, and exhaust valve 7, and also shows the positions of a pair of spark plugs 19, which are in diametrically opposed relationship. Although two spark plugs 19 are shown, only one spark plug can be used, if desired.

FIGS. 2 and 3 show that the supply of scavenging air is directed through scavenging valve 5 and toward a central cavity 20 in the top of piston 21. Valve seat 22 of scavenging valve 5 includes a bevel 23 along its innermost surface, relative to the axis of cylinder 1, to cause scavenging air to flow toward cavity 20. The seat of inlet valve 6 is also beveled in a similar manner so that the supply of the air-fuel mixture admitted through valve 6 is directed circumferentially along the inside periphery of cylinder 1, as shown by the curved, clockwise directed arrows in FIG. 2. In this way cooling of spark plug 19 is obtained, and also the occurrence of charge stratification, i.e., a rich mixture of air and fuel around the periphery of the cylinder, and air in the center, is promoted.

The valve timing diagram shown in FIG. 4 illustrates the operation of the several valves of the internal-combustion engine of the present invention. The regulation of the opening times of inlet valve 6 and of scavenging valve 5 results in such a time-flow diagram that each of these valves supplies half of the air requirements of the cylinder 1. In this connection, reference is also made to FIG. 5, which shows the course of the cylinder and exhaust pressures during the four-stroke cycle. The favorable course of the cylinder pressure during the power stroke is striking, and FIG. 5 shows the difference in cylinder pressure during the operating cycle when the present invention is used as compared with the cylinder pressure during the operating cycle without the present invention, the latter of which is referred to in FIG. 5 as "state of the art".

FIGS. 6A, 6B and 6C show the flow of the exhaust gases and the scavenging gas, respectively, during the last part of the upstroke of the piston during the exhaust stroke.

FIG. 7 illustrates the intake stroke following the exhaust stroke of FIGS. 6A, 6B, and 6C, and the circular movement of the air-fuel mixture supplied through inlet valve 6. In this way a relatively cool cylindrical outer jacket of a rich air-fuel mixture is provided, and inside it a core of scavenging air. The latter is also shown in FIG. 8 as the piston approaches the end of the compression stroke.

An example of the pressures and temperatures occurring near air cooling system 3 follows:

conduit 8—200 kPa and 30° C.

conduit 17—300 kPa and 80° C. upstream of intercooler 18 conduit 17—300 kPa and 40° C. downstream of intercooler 18 conduit 10—150 kPa and 2° C. upstream of throttle valve 11 conduit 10—120 kPa and 2° C. downstream of throttle valve 11

By way of further illustration of the construction and functioning of the engine in accordance with the invention, the following table provides a further example of the conditions under which the engine can operate in accordance with the prior art (situation 1) and in accordance with the present invention (situation 2). This table states all relevant temperatures and pressures, and is given by way of example only, and not to limit the conditions under which the present invention can be employed.

TABLE

| FACTOR | UNITS | SITUATION 1 PRIOR ART | SITUATION 2 THE PRESENT INVENTION |
| --- | --- | --- | --- |
| cylinder diameter | mm | 350 | 250 |
| piston stroke | mm | 480 | 300 |
| speed | r/min (RPM) | 430 | 1000 |
| output | kW | 180 | 160–200 |

TABLE-continued

| FACTOR | UNITS | SITUATION 1 PRIOR ART | SITUATION 2 THE PRESENT INVENTION |
|---|---|---|---|
| scavenging air temperature | °C. | 30 | 30 |
| scavenging air pressure | kPa | 185 | 195 |
| inlet air temperature | °C. | 30 | 2 |
| inlet air pressure | kPa | 125 | 180 |
| volume ratio of scavenging air to total air requirement | % | 50 | 20 |
| NOx content | g/GJ | >2000 | <270 |
| available pressure drop across throttle valve 11 | kPa | 60 | 20 |
| pressure after air cooling system | kPa | — | 300 |
| ignition timing | degrees before TDC | −18° | −18° |

Although particular embodiments of the present invention have been illustrated and described, it will be apparent to those skilled in the art that changes and modifications can be made without departing from the spirit of the present invention. It is therefore intended to encompass within the appended claims all such changes and modifications that fall within the scope of the present invention.

What is claimed is:

1. A four-stroke cycle internal combustion engine including a cylinder closed at one end by a cylinder head, a piston axially movable within the cylinder, and an inlet valve, an exhaust valve and a scavenging valve each movable toward and away from a respective valve seat carried in the cylinder head, said engine comprising:
   (a) scavenging air supply means for furnishing scavenging air to the scavenging valve at a pressure greater than atmospheric pressure;
   (b) air-fuel mixture supply means for furnishing an air-fuel mixture to the inlet valve and including throttle means for regulating the quantity of air-fuel mixture that enters the cylinder; and
   (c) air cooling means connected with the air-fuel mixture supply means for cooling the air-fuel mixture to a temperature below the temperature of the scavenging air.

2. An engine in accordance with claim 1, wherein the scavenging air supply means provides substantially one-half of the volume of air that enters the combustion chamber during an operating cycle and the air-fuel inlet mixture supply means provides substantially the other one half of the volume of air that enters the combustion chamber during the same operating cycle.

3. An engine in accordance with claim 1, wherein the axis of the inlet valve seat is offset from the axis of the cylinder and the inlet valve seat includes inlet flow direction control means for directing a major portion of the air-fuel mixture that enters the cylinder in a substantially circular direction relative to the cylinder axis.

4. An engine in accordance with claim 3, wherein the inlet flow direction control means includes an inlet angular bevel portion at the inlet valve seat, and the angle of inclination of the inlet angular bevel portion relative to the inlet valve seat axis is greater than the angle of inclination of the remainder of the inlet valve seat relative to the inlet valve seat axis.

5. An engine in accordance with claim 1, wherein the axis of the scavenging valve seat is offset from the axis of the cylinder, and the scavenging valve seat includes scavenging air flow direction control means for directing a major portion of the scavenging air that enters the cylinder toward the cylinder axis.

6. An engine in accordance with claim 5, wherein the scavenging air flow direction control means includes a scavenging angular bevel portion at the scavenging valve seat, and the angle of inclination of the scavenging angular bevel portion relative to the scavenging valve seat axis is greater than the angle of inclination of the remainder of the scavenging valve seat relative to the scavenging valve seat axis.

7. An engine in accordance with claim 1, wherein the air cooling means includes intercooling means, and the fuel is introduced into the air cooling means at a point upstream of the intercooling means.

8. An engine in accordance with claim 3, wherein the axis of the scavenging valve seat is offset from the axis of the cylinder and the scavenging valve seat includes scavenging air flow direction control means for directing a major portion of the scavenging air that enters the cylinder toward the cylinder axis.

9. An engine in accordance with claim 8, wherein a cooled air-fuel mixture is adjacent the cylinder wall and the engine includes spark plug means positioned to ignite the air-fuel mixture.

10. An engine in accordance with claim 9, wherein the piston includes a piston head having a recessed center portion and the scavenging air is received in the recessed center portion of the piston.

* * * * *